(12) United States Patent
Ulrich et al.

(10) Patent No.: US 7,239,929 B2
(45) Date of Patent: Jul. 3, 2007

(54) HIERARCHICAL COMPONENT BASED OBJECT RECOGNITION

(75) Inventors: Markus Ulrich, Munich (DE); Carsten Steger, Eching (DE)

(73) Assignee: MVTEC Software GmbH, Munich (DE)

(*) Notice: Subject to any disclaimer, the term of this patent is extended or adjusted under 35 U.S.C. 154(b) by 471 days.

(21) Appl. No.: 10/652,360

(22) Filed: Aug. 29, 2003

(65) Prior Publication Data

US 2004/0042661 A1 Mar. 4, 2004

(30) Foreign Application Priority Data

Aug. 30, 2002 (EP) .................... 02019162

(51) Int. Cl.
*G06F 19/00* (2006.01)
(52) U.S. Cl. ........................ 700/98; 345/420
(58) Field of Classification Search ............ 703/2, 703/22; 345/420; 382/154, 236, 294; 700/182, 700/98
See application file for complete search history.

(56) References Cited

U.S. PATENT DOCUMENTS

| | | | | |
|---|---|---|---|---|
| 5,278,946 A * | 1/1994 | Shimada et al. | ............... | 706/53 |
| 6,075,905 A * | 6/2000 | Herman et al. | ............. | 382/284 |
| 6,160,907 A * | 12/2000 | Robotham et al. | .......... | 382/154 |
| 6,396,961 B1 * | 5/2002 | Wixson et al. | ............... | 382/294 |
| 7,003,134 B1 * | 2/2006 | Covell et al. | ................ | 382/103 |

OTHER PUBLICATIONS

European Search Report for the priority application 02019162.3, dated Feb. 7, 2003.

K. Green et al., "Generic Recognition of Articulated Objects Through Reasoning About Potential Function", Computer Vision and Image Understanding, Academic Press, US, vol. 62, No. 2, Sep. 1, 1995.

S. Jung et al., "Tracking and Motion Estimation of the Articulated Object: A Hierarchical Kalman Filter Approach", Real-time Imaging, Academic Press Limited, GB, vol. 3, No. 6, Dec. 1, 1997.

* cited by examiner

*Primary Examiner*—Albert W. Paladini
(74) *Attorney, Agent, or Firm*—Abelman, Frayne & Schwab (57) ABSTRACT

The present invention provides a method for the recognition of objects in an image, where the objects may consist of an arbitrary number of parts that are allowed to move with respect to each other. In the offline phase the invention automatically learns the relative movements of the single object parts from a sequence of example images and builds a hierarchical model that incorporates a description of the single object parts, the relations between the parts, and an efficient search strategy. This is done by analyzing the pose variations (e.g., variations in position, orientation, and scale) of the single object parts in the example images. The poses can be obtained by an arbitrary similarity measure for object recognition, e.g., normalized cross correlation, Hausdorff distance, generalized Hough transform, the modification of the generalized Hough transform, or the similarity measure. In the online phase the invention uses the hierarchical model to efficiently find the entire object in the search image. During the online phase only valid instances of the object are found, i.e., the object parts are not searched for in the entire image but only in a restricted portion of parameter space that is defined by the relations between the object parts within the hierarchical model, what facilitates an efficient search and makes a subsequent validation step unnecessary.

46 Claims, 9 Drawing Sheets

Model Image:

Object Edges in the
Absence of Image Noise:

Object Edges in the
Presence of Image Noise:

Elimination and Merging:

|  | Hat (1) | Face (2) | Left Arm (3) | Outer Body (4) | Right Arm (5) | Inner Body (6) | "O" (7) | "b" (8) | "j" (9) | "t" (10) | "e" (11) | "c" (12) | Left Hand (13) | Right Hand (14) | Left Leg (15) | Right Leg (16) | Left Foot (17) | Right Foot (18) |
|---|---|---|---|---|---|---|---|---|---|---|---|---|---|---|---|---|---|---|
| Hat (1) | 1.0 | 1.0 | 0 | 0 | 0 | 0 | 0 | 0.1 | 0 | 0 | 0 | 0 | 0 | 0 | 0 | 0 | 0 | 0 |
| Face (2) |  | 1.0 | 0 | 0 | 0 | 0 | 0 | 0.1 | 0 | 0 | 0 | 0 | 0 | 0 | 0 | 0 | 0 | 0 |
| Left Arm (3) |  |  | 1.0 | 0 | 0 | 0 | 0 | 0 | 0 | 0 | 0 | 0 | 0- | 0 | 0 | 0- | 0 | 0 |
| Outer Body (4) |  |  |  | 1.0 | 0 | 0.9 | 0.9 | 1.0 | 0.9 | 1.0 | 0.9 | 1.0 | 0 | 0 | 0 | 0 | 0 | 0 |
| Right Arm (5) |  |  |  |  | 1.0 | 0 | 0 | 0 | 0 | 0 | 0 | 0 | 0 | 0 | 0 | 0 | 0 | 0 |
| Inner Body (6) |  |  |  |  |  | 1.0 | 0.9 | 1.0 | 0.9 | 1.0 | 0.9 | 1.0 | 0 | 0 | 0 | 0 | 0 | 0 |
| "O" (7) |  |  |  |  |  |  | 1.0 | 1.0 | 0.9 | 1.0 | 0.9 | 1.0 | 0 | 0 | 0 | 0 | 0 | 0 |
| "b" (8) |  |  |  |  |  |  |  | 1.0 | 1.0 | 1.0 | 1.0 | 1.0 | 0 | 0 | 0 | 0 | 0 | 0 |
| "j" (9) |  |  |  |  |  |  |  |  | 1.0 | 1.0 | 0.9 | 1.0 | 0 | 0 | 0 | 0 | 0 | 0 |
| "t" (10) |  |  |  |  |  |  |  |  |  | 1.0 | 1.0 | 1.0 | 0 | 0 | 0 | 0 | 0 | 0 |
| "e" (11) |  |  |  |  |  |  |  |  |  |  | 1.0 | 1.0 | 0 | 0 | 0 | 0 | 0 | 0 |
| "c" (12) |  |  |  |  |  |  |  |  |  |  |  | 1.0 | 0 | 0 | 0 | 0 | 0 | 0 |
| Left Hand (13) |  |  |  |  |  |  |  |  |  |  |  |  | 1.0 | 0 | 0 | 0 | 0 | 0 |
| Right Hand (14) |  |  |  |  |  |  |  |  |  |  |  |  |  | 1.0 | 0 | 0 | 0 | 0 |
| Left Leg (15) |  |  |  |  |  |  |  |  |  |  |  |  |  |  | 1.0 | 0 | 0 | 0 |
| Right Leg (16) |  |  |  |  |  |  |  |  |  |  |  |  |  |  |  | 1.0 | 0 | 0 |
| Left Foot (17) |  |  |  |  |  |  |  |  |  |  |  |  |  |  |  |  | 1.0 | 0 |
| Right Foot (18) |  |  |  |  |  |  |  |  |  |  |  |  |  |  |  |  |  | 1.0 |

FIG. 9

Angle Variation:

Position Variation:

HIERARCHICAL COMPONENT BASED OBJECT RECOGNITION

FIELD OF THE INVENTION

This invention relates generally to machine vision systems, and more particularly, to visual recognition of objects that consist of several object parts that are allowed to move with respect to each other.

BACKGROUND OF THE INVENTION

Object recognition is part of many computer vision applications. It is particularly useful for industrial inspection tasks, where often an image of an object must be aligned with a model of the object. The transformation (pose) obtained by the object recognition process can be used for various tasks, e.g., pick and place operations, quality control, or inspection tasks. In most cases, the model of the object is generated from an image of the object. Such pure 2D approaches are frequently used, because it usually is too costly or time consuming to create a more complicated model, e.g., a 3D CAD model. Therefore, in industrial inspection tasks one is typically interested in matching a 2D model of an object to the image. A survey of matching approaches is given in R7 (see attached Reference list). The simplest class of object recognition methods is based on the gray values of the model and the image (R7, R16). A more complex class of object recognition uses the object's edges for matching, e.g., the mean edge distance (R6), the Hausdorff distance (R20), or the generalized Hough transform (GHT) (R4).

All of the above approaches do not simultaneously meet the high industrial demands: robustness to occlusions, clutter, arbitrary illumination changes, and sensor noise as well as high recognition accuracy and real-time computation. The similarity measure presented in R21, which uses the edge direction as feature, and a modification of the GHT (R24), which eliminates the disadvantages of slow computation, large memory amounts, and the limited accuracy of the GHT, fulfill the industrial demands. Extensive performance evaluations (R25), which also include a comparison to standard recognition methods, showed that these two approaches have considerable advantages.

All of the above mentioned recognition methods have in common that they require some form of a rigid model representing the object to be found. However, in several applications the assumption of a rigid model is not fulfilled. Elastic or flexible matching approaches (R3, R13, R5) are able to match deformable objects, which appear in medicine when dealing with magnetic resonance imaging or computer tomography, for example. Approaches for recognizing articulated objects are also available especially in the field of robotics (R11).

Figure 1:
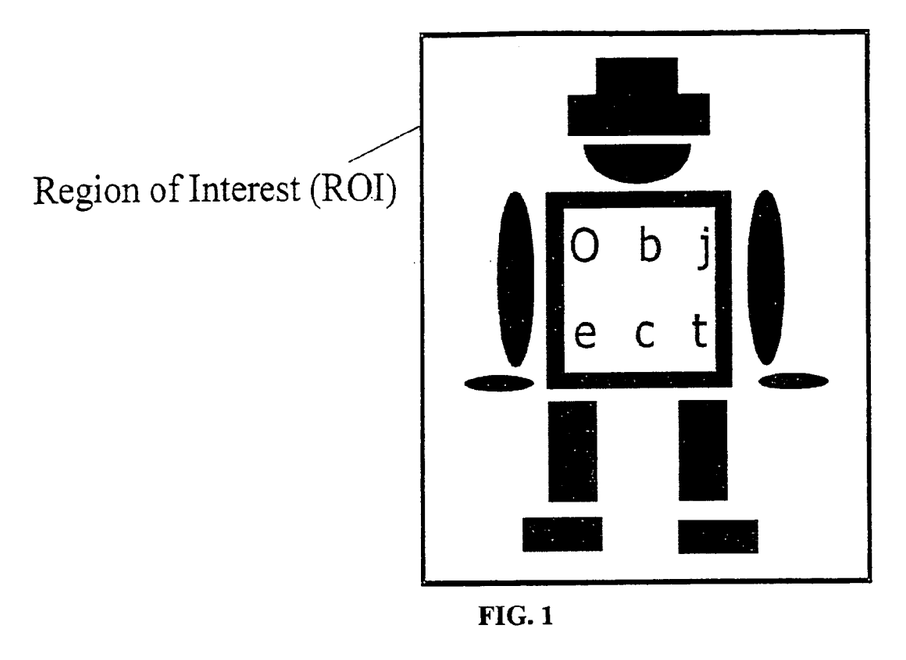
FIG. 1 is a model image of an example object and a user defined region of interest for automatic initial decomposition.
Figure 3:
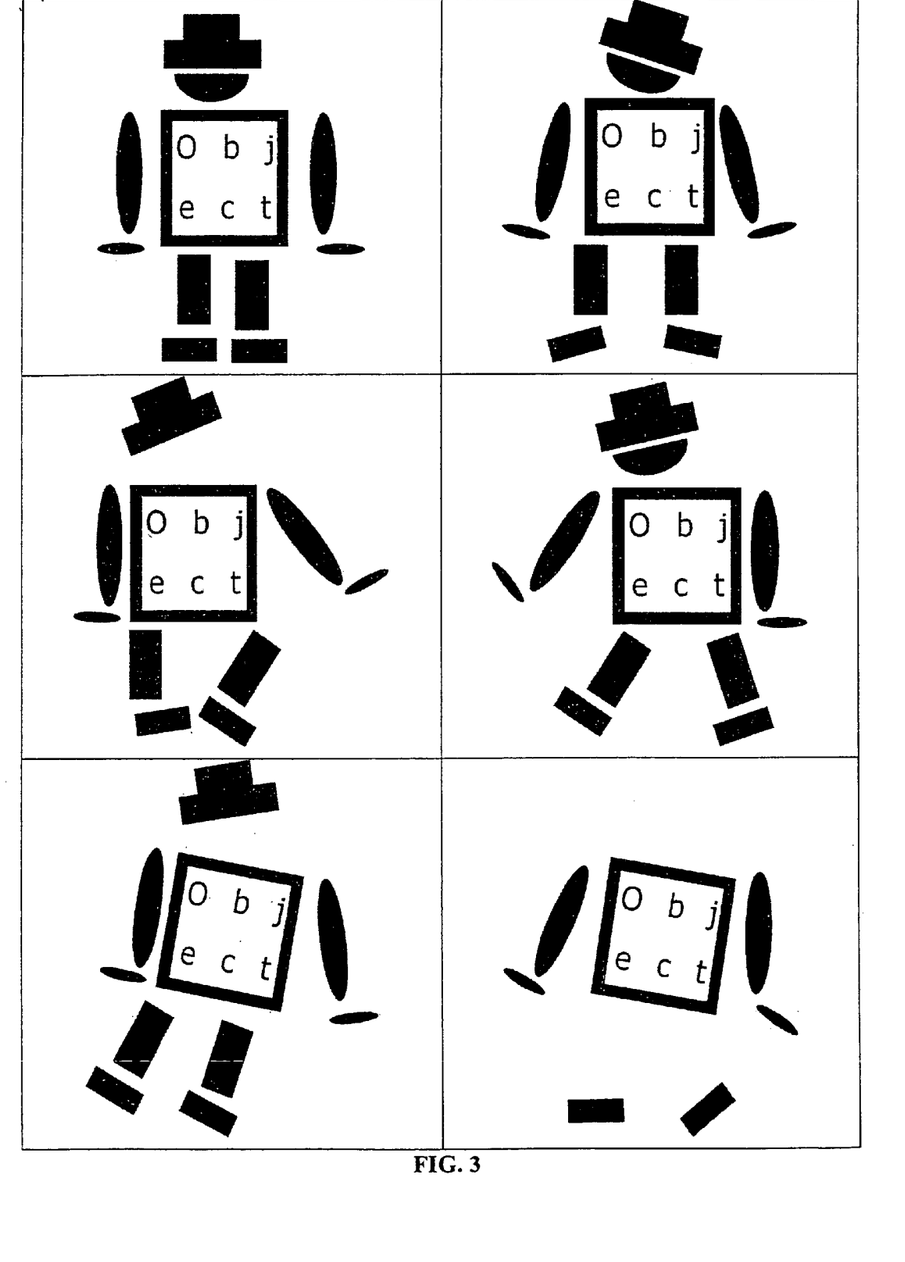
FIG. 3 is a sequence of six example images that show the mutual movements of the parts of the object introduced in FIG. 1.

Indeed, for industrial applications like quality control or inspection tasks it is less important to find elastic or articulated objects, but to find objects that consist of several parts that show arbitrary mutual movement, i.e., variations in distance, orientation, and scale. These variations potentially occur whenever a process is split into several single procedures that are—by intention or not—insufficiently "aligned" to each other, e.g., when applying a tampon print using several stamps or when equipping a circuit board with transistors or soldering points. In FIG. 1 an example object is shown. FIG. 3 illustrates the mutual movements (variations) of the object parts. Clearly, when taking such kind of objects as rigid it may not be found by conventional object recognition approaches. However, when trying to find the individual parts separately the search becomes computationally expensive since each part must be searched for in the entire image and the relations between the parts are not taken into account. This problem can hardly be solved taking articulated objects into account since there is no true justification for hinges, but the mutual variations can be more general. Because the object may, for example, consist of several rigid parts, obviously, also elastic objects cannot model these movements. One possible solution is to generate several models, where each model represents one configuration of the model parts and to match all of these models to the image. However, for large variations, this is very inefficient and not practical for real-time computation. In U.S. Pat. No. 6,324,299 (R1) a method of locating objects is described where the object has a plurality of portions. In a first step the coarse pose of the object is determined and in a subsequent step the fine poses of the object portions are calculated. Therefore, the variations of the portions must be small enough to find the coarse pose of the object, in contrast to the present invention, where the variations are explicitly modeled and may be of arbitrary form and of arbitrary size. Additionally, in U.S. Pat. No. 6,324,299 the variations are not automatically learned in a training phase as it is done in the present invention. U.S. Pat. No. 6,411,734 (R2) extends the method presented in U.S. Pat. No. 6,324,299 by checking the found object portions whether they fail to satisfy user-specified requirements like limits on the poses of the object portions. The advantage of the present invention is that this check can be omitted since the object parts are only searched over the range of valid poses and therefore, only valid instances are returned.

SUMMARY OF THE INVENTION

This invention provides a method for automatically learning a hierarchical object recognition model that can be used to recognize objects in an image, where the objects consist of several parts that are allowed to move with respect to each other in an arbitrary way. The invention automatically decomposes the object into its parts using several example images in which the mutual movements (variations) of the object parts are shown and analyzes the variations. In a preferred embodiment, the single object parts are assumed to be rigid, thus showing no deformations. In a further preferred embodiment only rigid transformations (translation and rotation) are taken into account. Thus, the objects can be found if they are at arbitrary position and orientation in the image. Additional pose parameters, e.g., scale, can be taken into account in a straightforward manner.

The mutual variations of the object parts are analyzed and used to build a hierarchical model that contains representations of all rigid object parts and a hierarchical search strategy, where the parts are searched relatively to each other taking the relations between the parts into account.

This generation of the hierarchical model will be called offline phase and must be executed only once and therefore is not time-critical. But in the time critical online phase, in which the object is searched in an image, the hierarchical model facilitates a very efficient search.

Figure 4:
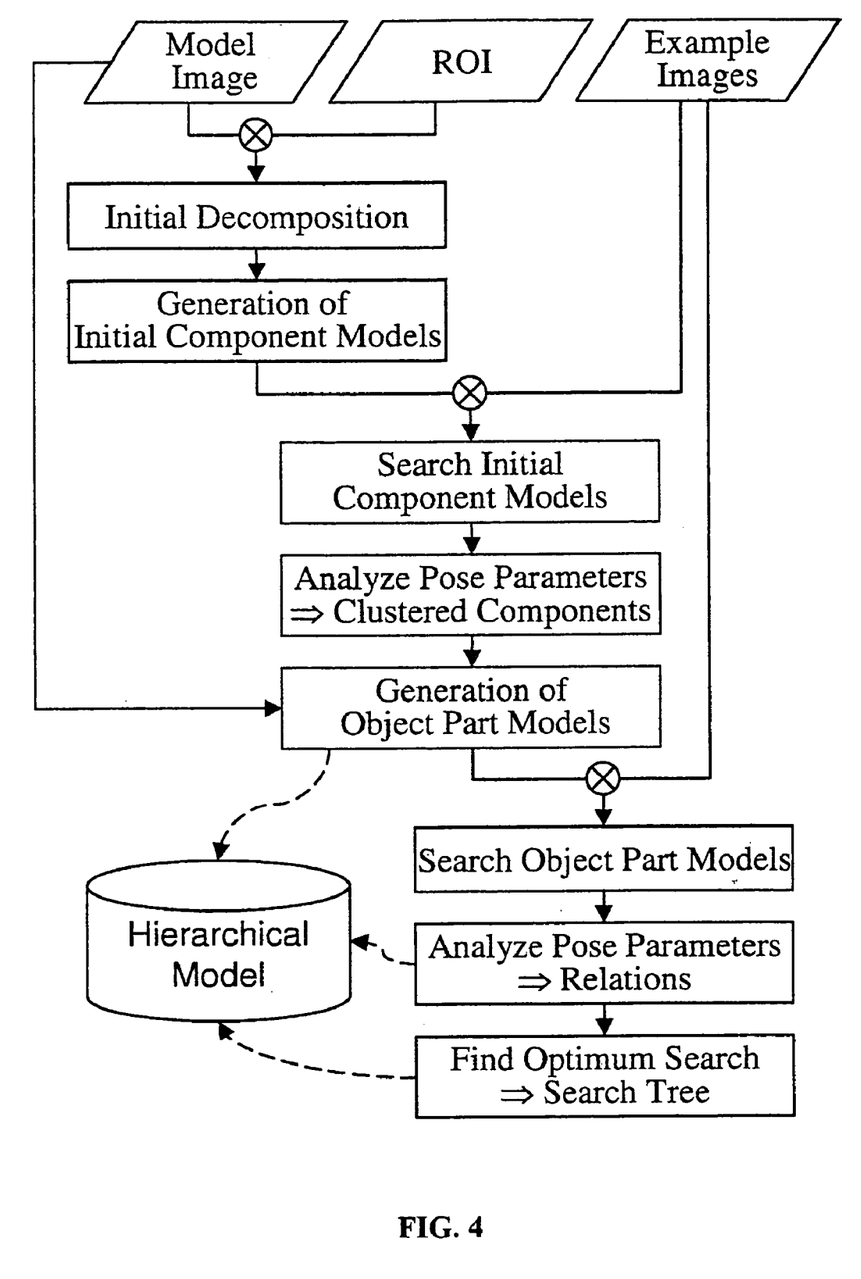
FIG. 4 is a flowchart of a preferred embodiment of the invention showing the single steps of the hierarchical model computation.

The single steps of the hierarchical model computation are shown in the flowchart of FIG. 4. The only input data of the proposed algorithm are a sample image of the object (model image), in which the object is defined by the user, e.g., using a region of interest (ROI), and some additional example images that, at least qualitatively, describe the mutual movements of the single object parts.

The first step is to decompose the object, which is defined by the ROI within the model image, into small initial components. Note that these components need not coincide with the real object parts. For instance, if the connected components of the image edges are used as criterion for decomposition the following components would result from the example of FIG. 1: 1 hat, 1 face, 2 arms, 2 hands, 2 legs, 2 feet, the outer rectangle of the upper body, the inner rectangle of the upper body and at least 1 component for each letter printed on the upper body. For each initial component a representation is calculated that can be used to search the initial component in the example images. This representation will be called initial component model and can be built using an arbitrary recognition method that is able to find objects under at least rigid transformation (translation and rotation). In a preferred embodiment of the invention a recognition method that is based on the image edges is used. Additionally, if industrial demands are to be fulfilled the similarity measure described in R21 or in "System and method for object recognition", European patent application 00120269.6, (R22) or the modified Hough transform (R24) should be preferred.

Each initial component is searched for in all example images using the initial component models. Thus, the pose parameters of each initial component in each example image are obtained. These parameters are analyzed and those initial components that form a rigid object part are clustered, leading to the final decomposition, which corresponds to the object parts. In the example of FIG. 1 and FIG. 3, the hat and the face are clustered into one rigid part since they show the same movement in each image. The same holds for all initial components that form the upper part of the body. They are also clustered into one rigid part. For each of the newly generated (clustered) parts a representation is calculated by applying the same recognition method as for the initial components. This representation will be called object part model. It is used to search the newly generated object parts in the example images. The initial component models that are not clustered are used unchanged as object part models. Therefore, each object part is described by one object part model. The relations (relative movements) between each pair of the rigid object parts are computed by analyzing the pose parameters over the sequence of example images and stored in a fully connected directed graph, where the vertices represent the object parts and the link between vertices i and j describes the overall movement of part j relatively to part i. By computing the shortest arborescence of the graph it is possible to ascertain a hierarchical search tree that incorporates an optimum search strategy in the sense that the search effort is minimized. Finally, the hierarchical model consists of the object part models, the relations between the object parts, and the optimum search strategy.

In the online phase the hierarchical model can then be used to search the entire object containing the movable object parts in an arbitrary search image. This is performed by searching the object parts in the image using the object part models of the chosen similarity measure. Note that only one object part must be searched within the entire search range, whereas the remaining object parts can be searched in a very limited search space, which is defined by the relations in combination with the search tree. This facilitates an efficient search despite the relative movements of the object parts.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENTS

The single steps of the hierarchical model computation are shown in the flowchart of FIG. 4. The only input data of the proposed algorithm are a sample image of the object (model image), in which the object is defined by the user, e.g., using a region of interest (ROI), and some additional example images that, at least qualitatively, describe the mutual movements of the single object parts.

The first step is to decompose the object, which is defined by the ROI within the model image, into small initial components. Note that these components need not coincide with the real object parts. For instance, if the connected components of the image edges are used as criterion for decomposition the following components would result from the example of FIG. 1: 1 hat, 1 face, 2 arms, 2 hands, 2 legs, 2 feet, the outer rectangle of the upper body, the inner rectangle of the upper body and at least 1 component for each letter printed on the upper body. For each initial component a representation is calculated that can be used to search the initial component in the example images. This representation will be called initial component model and can be built using an arbitrary recognition method that is able to find objects under at least rigid transformation (translation and rotation). In a preferred embodiment of the invention a recognition method that is based on the image edges is used. Additionally, if industrial demands are to be fulfilled the similarity measure described in R21 or in "System and method for object recognition", European patent application 00120269.6, (R22) or the modified Hough transform (R24) should be preferred.

Each initial component is searched for in all example images using the initial component models. Thus, the pose parameters of each initial component in each example image are obtained. These parameters are analyzed and those initial components that form a rigid object part are clustered, leading to the final decomposition, which corresponds to the object parts. In the example of FIG. 1 and FIG. 3, the hat and the face are clustered into one rigid part since they show the same movement in each image. The same holds for all initial components that form the upper part of the body. They are also clustered into one rigid part. For each of the newly generated (clustered) parts a representation is calculated by applying the same recognition method as for the initial components. This representation will be called object part model. It is used to search the newly generated object parts in the example images. The initial component models that are not clustered are used unchanged as object part models. Therefore, each object part is described by one object part model. The relations (relative movements) between each pair of the rigid object parts are computed by analyzing the pose parameters over the sequence of example images and stored in a fully connected directed graph, where the vertices represent the object parts and the link between vertices i and j describes the overall movement of part j relatively to part i. By computing the shortest arborescence of the graph it is possible to ascertain a hierarchical search tree that incorporates an optimum search strategy in the sense that the search effort is minimized. Finally, the hierarchical model consists of the object part models, the relations between the object parts, and the optimum search strategy.

In the online phase the hierarchical model can then be used to search the entire object containing the movable object parts in an arbitrary search image. This is performed by searching the object parts in the image using the object part models of the chosen similarity measure. Note that only one object part must be searched within the entire search range, whereas the remaining object parts can be searched in a very limited search space, which is defined by the relations in combination with the search tree. This facilitates an efficient search despite the relative movements of the object parts.

Initial Decomposition

In the first step of the invention, the object is initially broken up into small components. This can be done either automatically or interactively by the user. The condition the initial decomposition must fulfill is that each rigid object part must be represented by at least one initial component; otherwise the algorithm is not able to split this component later on and to find the rigid object parts automatically. Therefore, an over-segmentation should be preferred. However, very small initial components fail the property of being unique, but this can be balanced by the invention at it is shown later.

Figure 5:
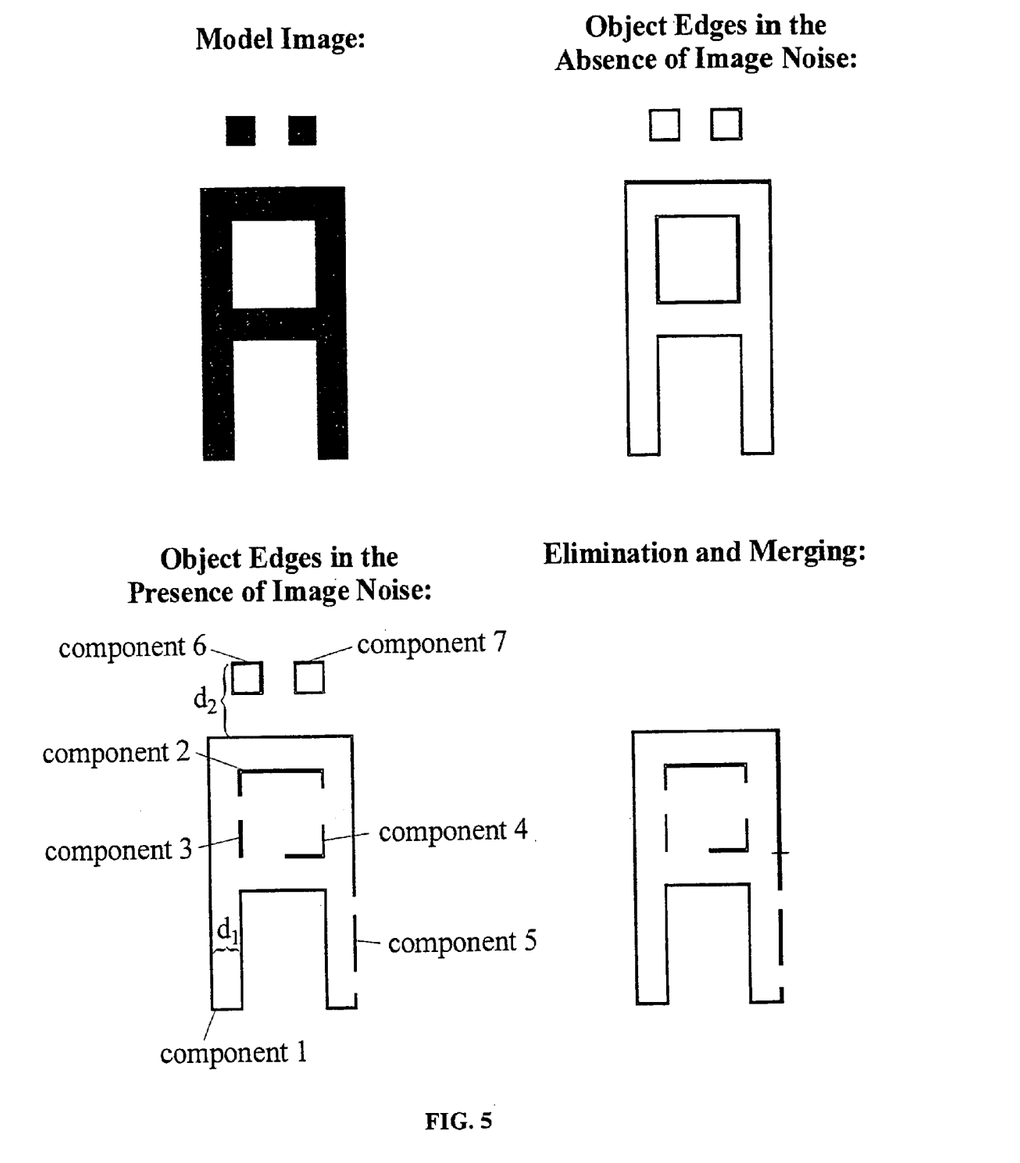
FIG. 5 is an illustration of the elimination and merging of small initial components.
Figure 6:
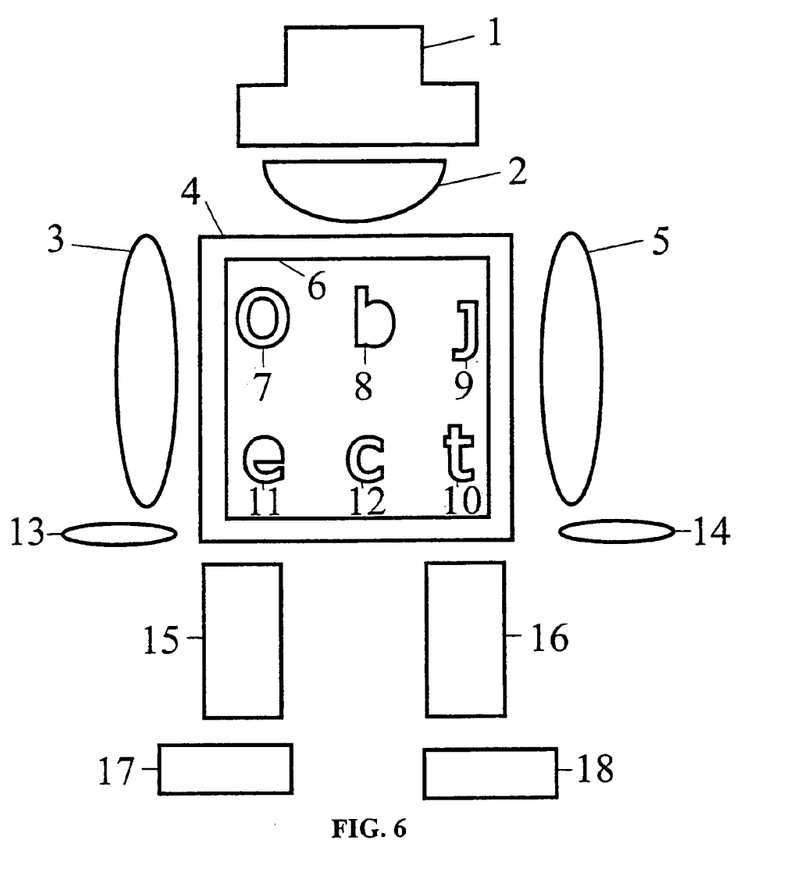
FIG. 6 is an image showing the result of the automatic initial decomposition of the object introduced in FIG. 1 when using the connected components of the model image edges as criterion and applying the elimination and merging of small initial components. The initial components are visualized by their image edges. To identify the initial components a number is assigned to each component.

If the user chooses to do the initial decomposition automatically he has to define the entire object by a region of interest (ROI). A ROI is an arbitrarily shaped part of an image that restricts the image domain for further processing. In the example of FIG. 1 the ROI is a rectangle that encloses the entire object. The image domain defined by the ROI is then used to perform the initial decomposition. Several grouping methods that can be found in literature are suitable for this task. In a preferred embodiment of the invention, edges are extracted in the model image by applying a threshold on an edge filter amplitude, e.g. of the Sobel filter. The connected components of the edges are treated as individual initial components. In a preferred embodiment initial components that are smaller than a user defined threshold are either eliminated or merged to neighboring components to avoid meaningless initial components that are due to noise or hard to identify in the example images: In a first step the size of the initial components, e.g., the number of edge pixels, is calculated. If the size is below the user defined threshold it must be checked whether it is possible to merge the current initial component to a neighboring component. If a merging is not possible the initial component is eliminated. The check is performed by computing the distances of all edge pixels in the current initial component to all other initial components with a size above the user defined threshold. If the maximum distance of all edge pixels to a compared component is smaller than a threshold, the probability of these two components belonging together is high. Therefore, the current initial component is merged to the compared component. In the upper left picture of FIG. 5 a model image is shown. The upper right picture of FIG. 5 is the result of the edge extraction step under the assumption that no image noise is present in the image. The lower left picture of FIG. 5 illustrates the result of the edge extraction step when dealing with real images containing noise to a certain degree. The first step of the initial decomposition leads to 7 independent components. The size of components 2, 3, 4, 5, 6, and 7 is smaller than the user defined threshold. In the lower right picture of FIG. 5 the result of the elimination and merging is shown. The components 2, 3, 4, and 5 are affiliated to component 1 because the maximum distance $d_1$ is smaller than the predefined threshold. The components 6 and 7 are eliminated because the maximum distance $d_2$ exceeds the predefined threshold. In FIG. 6 the initial components of the object introduced in FIG. 1 are visualized.

As mentioned, other grouping methods or combinations of them could also be included in the invention to do the initial decomposition: Gestalt psychology has uncovered a set of principles guiding the grouping process in the visual domain (R26, R15, R28). Computer vision has taken advantage of these principles, e.g., in the field of perceptual organization and grouping (R23, R18, R27, R17).

Figure 2:
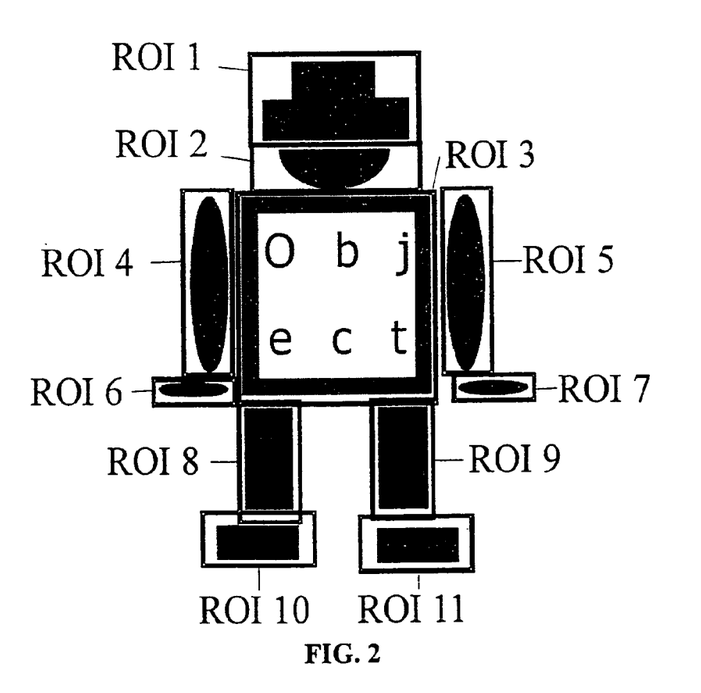
FIG. 2 is a model image of an example object and several user defined region of interest for manual initial decomposition.

If the user chooses to do the initial decomposition manually, not only one ROI must be specified by the user but a separate ROI for each initial component. All extracted edges within a specified ROI are then treated as one initial component. Thus, it is possible to take advantage of previous knowledge of the user. In the example of FIG. 2 a total of 11 ROIs are defined by the user. The selected ROIs imply that the user was sure that the upper body forms one rigid object part and that he was not sure whether the head and the face form one rigid object part.

Generation of Initial Component Models

Figure 7A:
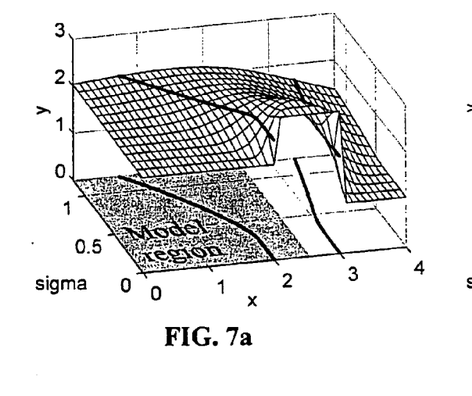
FIG. 7a is a plot showing the development of an image edge in scale space under the existence of a neighboring edge.
Figure 7B:
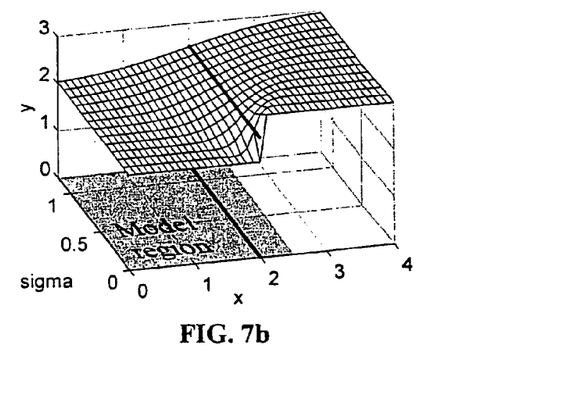
FIG. 7b is a plot showing the development of the image edge of FIG. 7a after eliminating the neighboring edge.

In the next step the initial component models are computed. In a preferred embodiment of the invention the implementation of the similarity measure presented in R21 is used as recognition approach to calculate the initial component models and to search the initial components in the example images. This approach uses a recursive coarse-to-fine strategy to speed up the recognition, like most implementations of conventional object recognition methods. This includes a subsampling of both the model image and the search image in combination with an appropriate image smoothing leading to a scale-space representation of both images. However, one has to take care of unfavorable scale-space effects. In scale-space the edges of the initial components are influenced by neighboring edges. This is uncritical in most cases when dealing with large objects since there are still enough edges of the object left that are not influenced by neighboring edges and therefore still enable a good match. However, some problems occur when dealing with small objects, like the initial components, since the ratio between the number of edge pixels in the initial components and the number of neighboring edge pixels is becoming small, i.e., the influence of the neighboring edges is increasing. In FIG. 7a and FIG. 7b, the principle of the scale-space effect is illustrated. In FIG. 7a a 1D gray value profile, which includes two edges, is shown. Only the left edge belongs to the initial component and therefore should be represented in the initial component model whereas the right edge represents a neighboring edge. In scale-space the disturbance of the model edge caused by the neighboring edge increases with the degree of smoothing (sigma). This problem could be avoided if no scale-space representation is used within the recognition method. However, this would lead to high computation times that are not suitable. Therefore, the gray values at both sides of the initial component edges are artificially continued to the surrounding area to eliminate the disturbing neighboring edges. To eliminate all disturbing edges the size of the surrounding area must be chosen appropriately. If, for example, a scale-space discretization is used in a way that four neighboring pixels are merged into one within two successive discretization steps and the total number of steps is l, then the gray values at both sides of the initial component edges should be continued by at least $2^l$ pixels to fully eliminate the influence of all neighboring edges. The result is shown in FIG. 7b. The model edge is no longer disturbed by the neighboring edge. Other, more sophisticated, approaches explicitly model the edges and subsequently reconstruct the gray values in the surrounding of the edges (R10). These could be incorporated easily in the invention.

After the disturbing edges have been eliminated for each initial component an initial component model is built. Since it is possible that a neighboring initial component belongs to the same rigid object part than the current initial component, the neighboring edges (belonging to the neighboring initial component) will be also present in the example images in the same position relative to the current initial component. Therefore, for each initial component a second initial component model is built without previously eliminating the neighboring edges. This leads to a higher possibility that all matches are found in the example images. The consequence that the search for the initial components leads to duplicate matches is not critical since it is compensated using the algorithm described in the following section. Basically, false positives or double matches are preferred during the offline phase in comparison to missing a match.

Search of Initial Component Models

The initial component models are used to search the initial components in each example image using the selected recognition approach. Thus, all poses $P_i$ of each component i in each example image are obtained. In a preferred embodiment the position refers to an arbitrary reference point of the initial component model, e.g., the center of gravity of the edge pixels within the initial component. The orientation refers to the orientation of the initial component in the model image, i.e., the orientation of each initial component in the model image is 0°. The poses $P_i$ include the poses obtained when searching the initial component model that was built after eliminating the neighboring edges, as well as the poses obtained when searching the initial component model that was built without previously eliminating the neighboring edges.

Besides the problem of disturbing edges another problem arises when searching for small initial components: The result of the search may not be unique because of self-symmetries of the initial components, mutual similarities between the initial components, or similarities of the initial components to other structures in the example image. Additionally, the number of matches doubles in many cases, since two initial component models are used for the search of each initial component. These two problems can be solved using the same algorithm, which is presented in the following paragraph. To maintain the description of the algorithm as simple as possible the second problem of using two initial component models is neglected. In the example of FIG. 1, the left leg, for instance, is found four times in the first example image (upper left image of FIG. 3): At the true position of the left leg, at the position of the right leg and each at orientation 0° and 180° (cf. FIG. 8). Consequently, it is indispensable to solve these ambiguities to get the most likely pose for each component. Let n be the number of initial components and $M_i$ the pose of component i in the model image (i=1, . . . , n). The pose represented by match k of initial component i in an example image is described by $E_i^k$, where k=1, . . . , $n_i$ and $n_i$ is the number of matches (found instances) of component i in the current example image. The ambiguities are solved by minimizing the following equation $$\sum_{i=1}^{n} \operatorname*{argmin}_{k=1\ldots n_i}(\delta_i^k) \rightarrow \min \quad \text{(Equation 1)}$$

$$\delta_i^k = \sum_{j=1}^{n} \operatorname*{argmin}_{l=1\ldots n_j}(\Psi(M_i, M_j, E_i^k, E_j^l)), \quad \text{(Equation 2)}$$

while taking the two constraints into account that each initial component is attributed to at most one physical match and each physical match is attributed to at most one initial component. A physical match is the real or physical mapping of an initial component to an example image, i.e., one physical match may be occupied by several matches returned by the recognition method due to the above mentioned ambiguities. $\delta_i^k$ is a variation measure of match k of component i and $\Psi$ is a cost function that rates the relative pose of match l of component j to match k of component i in the example image by comparing it to the relative pose of the two components in the model image. The more the current relative pose in the example image differs from the relative pose in the model image the higher the cost value. In a preferred embodiment of the invention, $\Psi$ takes the difference in relative position $\Delta$pos and relative orientation $\Delta$orient into account, where the difference in position is measured in pixels and the difference in orientation is measured in degrees. To be able to combine the two measurements into the cost function $\Psi$ a balance factor w is introduced that balances the relative influences of the two measurements, leading to the following equation:

$$\psi\sqrt{\|\Delta \text{pos}\|^2+(w\cdot\|\Delta \text{orient}\|)^2} \quad \text{(Equation 3)}$$

Optionally, $\psi$ can be mapped to any other function, which is strictly monotonic increasing. In a preferred embodiment, the logarithm is computed to favor small variations. Note that additional pose parameter (e.g. scale) can be included easily by introducing a separate balance factor for each additional parameter.

Figure 8:
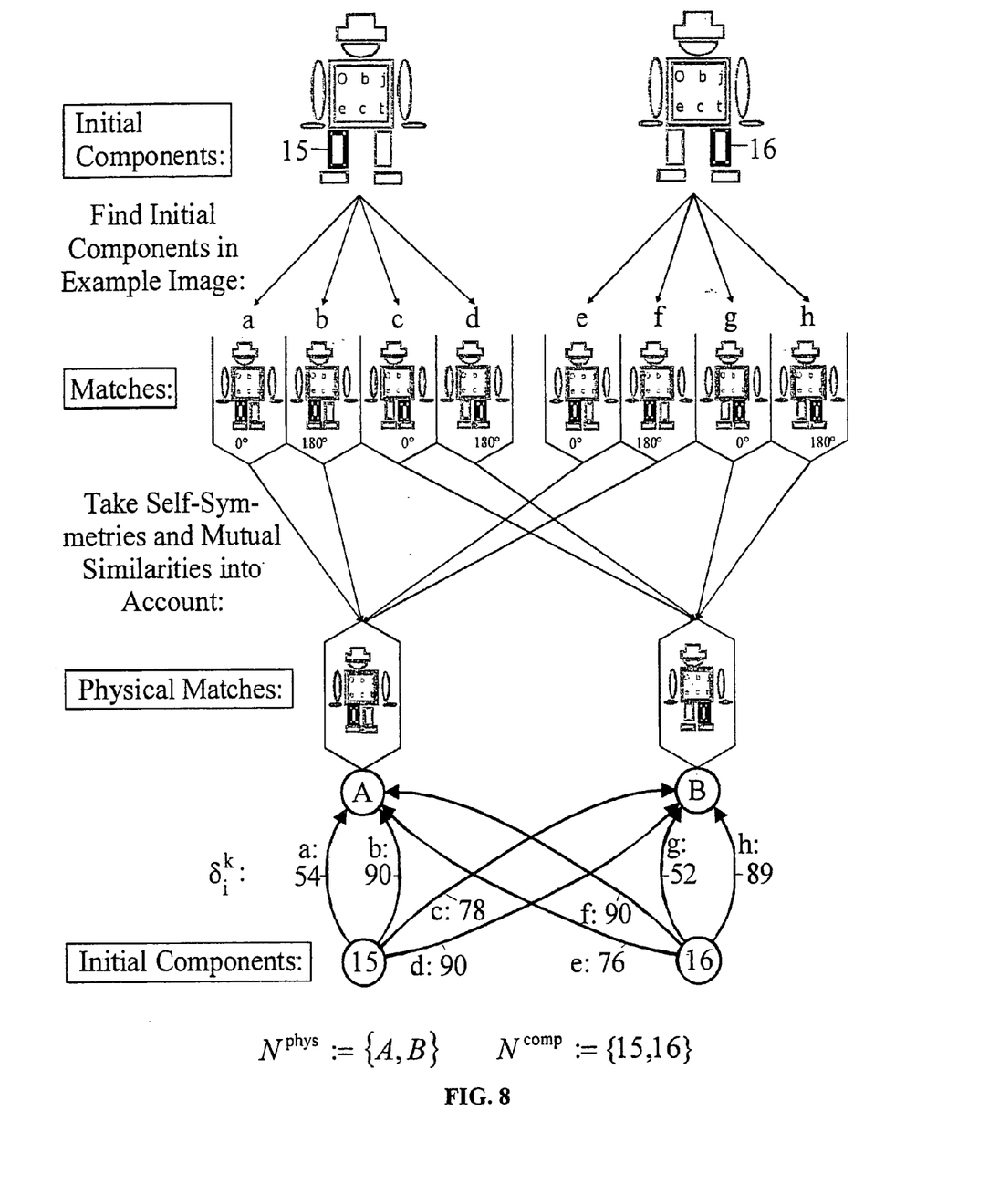
FIG. 8 is an illustration of the network used for solving the ambiguities that are due to self-symmetries of the initial components, due to mutual similarities between the initial components, or due to similarities of the initial components to other structures in the example images.

The minimization of Equation 1 follows the principle of human perception where the correspondence problem of apparent motion is solved by minimizing the overall variation (R23). To solve Equation 1 while taking the two constraints into account the problem is formulated as a bipartite graph matching problem, which can be solved applying linear programming techniques, for example: The nodes in the one set $N^{comp}$ of the bipartite graph represent the initial components, the nodes in the other set $N^{phys}$ represent the physical matches as it is illustrated in FIG. 8. Each match is represented by one link in the graph. To check whether the matches refer to the same physical match in the example image, information about the self-symmetries of the initial components and about the mutual similarities between the initial components must be considered. This information can be obtained by matching each initial component to itself and to all other components in a preliminary stage using the similarity measure of the chosen recognition method. The poses of these matches can be used to decide whether two matches in the example image refer to the same physical match. Each edge within the bipartite graph corresponds to one separate match and is assigned the value of the corresponding $\delta_i^k$. Now the objective function z that must be maximized (optimized) can be set up:

$$z = \sum_{i=1}^{n}\sum_{k=1}^{n_i}(\delta^{max}-\delta_i^k)x_i^k \quad \text{(Equation 4)}$$

$x_i^k$ are the unknowns in the optimization, where $x_i^k$ is 1, if the match k of initial component i is included in the solution, and 0 otherwise. Since the number of matches should be maximized, the variations $\delta_i^k$ (which should be minimal) must be converted into weights $\delta^{max}-\delta_i^k$ (which should be maximal), where $\delta^{max}$ is a constant value such that $\delta^{max}>\delta_i^k$ $\forall\{i,k|1\leq i\leq n, 1\leq k\leq n_i\}$. Additionally, several constraints must be stated and introduced into the optimization:

$$x_i^k \geq 0 \quad \forall\{i,k \mid 1 \leq i \leq n, 1 \leq k \leq n_i\} \quad \text{(Equation 5)}$$

$$x_i^k \leq 1 \quad \forall\{i,k \mid 1 \leq i \leq n, 1 \leq k \leq n_i\} \quad \text{(Equation 6)}$$

$$\sum_{k=1}^{n_i} x_i^k \leq 1 \quad \forall\{i, n_i \mid i \leq 1 \leq n, n_i \geq 2\} \quad \text{(Equation 7)}$$

$$\sum x_i^k \leq 1 \quad \forall \text{ physical matches, where at least two } x_i^k \text{ are assigned to the current physical match} \quad \text{(Equation 8)}$$

The first two constraints (Equations 5 and 6) ensure that all $x_i^k$ either have a value of 1 or a value of 0 in the solution, i.e., either match k of initial component i is part of the solution or it is not. The third constraint (Equation 7) ensures that each initial component is assigned to at most one match. The fourth constraint (Equation 8) ensures that each physical match is assigned to at most one initial component. This linear programming problem can be solved by different algorithms, which are available in literature, e.g., by the simplex method (R9, R19). The ambiguities are solved for each example image individually.

Clustering of Initial Components

Since the initial decomposition led to an over-segmentation, the initial components belonging to the same rigid object part must be merged to larger clusters by analyzing the pose parameters obtained in the previous step. Initial components that show similar apparent movement over all example images are clustered together.

First, the pairwise probability of two initial components belonging to the same rigid object part is calculated. Let $M_1=(x_1^M, y_1^M, \phi_1^M)$, $M_2=(x_2^M, y_2^M, \phi_2^M)$, $E_1=(x_1^E, y_1^E, \phi_1^E)$, and $E_2=(x_2^E, y_2^M, \phi_2^E)$ be the poses of two initial components in the model image and in an example image. Without loss of generality $\phi_1^M$ and $\phi_2^M$ are set to 0, since the orientations in the model image are taken as reference. The relative position of the two initial components in the model image is expressed by $\Delta x^M=x_2^M-x_1^M$ and $\Delta y^M=y_2^M-y_1^M$. The same holds for the relative position $\Delta x^E$ and $\Delta y^E$ in the example image. To be able to compare the relative position in the model and in the example image, the relative position in the example image must be rotated back to the reference orientation:

$$\begin{bmatrix}\Delta \tilde{x}^E \\ \Delta \tilde{y}^E\end{bmatrix} = \begin{bmatrix}\cos\varphi_1^E & \sin\varphi_1^E \\ -\sin\varphi_1^E & \cos\varphi_1^E\end{bmatrix}\begin{bmatrix}\Delta x^E \\ \Delta y^E\end{bmatrix} \quad \text{(Equation 9)}$$

If the used recognition method additionally returns accuracy information of the pose parameters, the accuracy of the relative position is calculated with the law of error propagation. Otherwise the accuracy must be specified empirically. Then, the following hypothesis can be stated:

$$\Delta \tilde{x}^E = \Delta x^M$$

$$\Delta \tilde{y}^E = \Delta y^M \quad \text{(Equations 10)}$$

$$\phi_1^E = \phi_2^E$$

Figure 9:
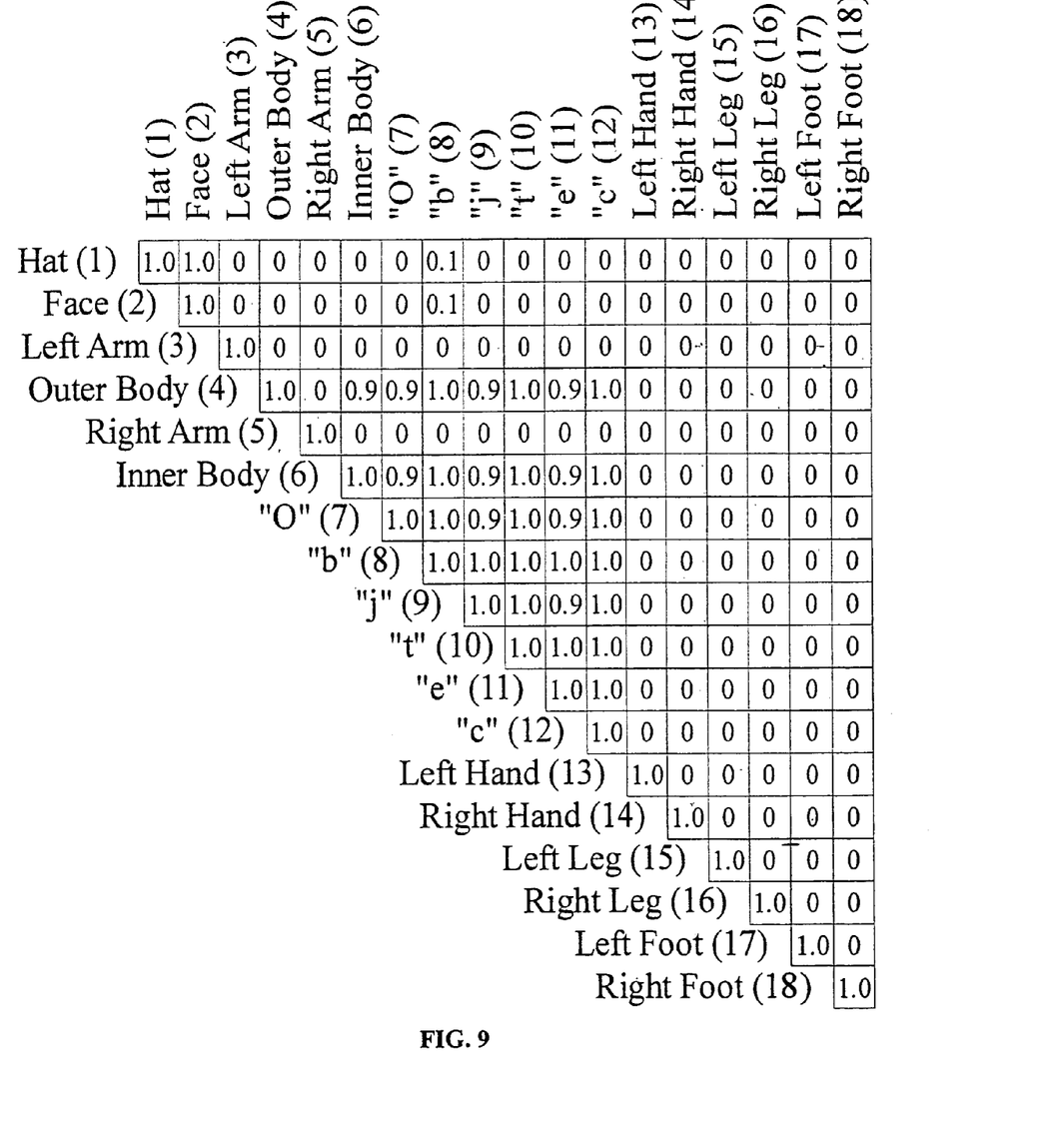
FIG. 9 is a graphical representation of the similarity matrix for the initial components of FIG. 6. Each matrix element contains the probability that the corresponding two initial components belong to the same rigid object part. Since this matrix is symmetric only the upper triangular matrix is shown.

The probability of the correctness of this hypothesis corresponds to the probability that both initial components belong to the same rigid object part. It can be calculated using the equations for hypothesis tests, e.g., as given in R14. This is done for all object pairs and for all example images yielding a symmetric similarity matrix, in which at row i and column j the probability that the initial components i and j belong to the same rigid object part is stored. In a preferred embodiment the entries in the matrix correspond to the minimum value of the probabilities in all example images. To get a higher robustness to mismatches the mean or other statistical values can be used instead of the minimum value. In FIG. 9 the similarity matrix for the example given in FIG. 1 and FIG. 3 is displayed. One can see the high probability that hat and face belong together and that the initial components of the upper part of the body form a rigid object part.

Based on this similarity matrix the initial components are clustered, e.g., using a pairwise clustering strategy that successively merges the two entities with the highest similarity until the maximum of the remaining similarities is smaller than a predefined threshold. Other clustering techniques can be incorporated easily in the invention.

Generation of Object Part Models and Search

Models for the recognition approach for the newly clustered components are created and searched in all example images, as described above. This avoids errors that are introduced when taking the average of the single initial poses of each initial component within the cluster as pose for the newly clustered component. However, this information can be exploited to reduce the search space by calculating approximate values for the reference point and the orientation angle of the new clustered component in the example images. After this step for each rigid object part an object part model is available and the pose parameters for each object part in each image are computed.

Computation of the Relations Between Object Parts

Figure 10:
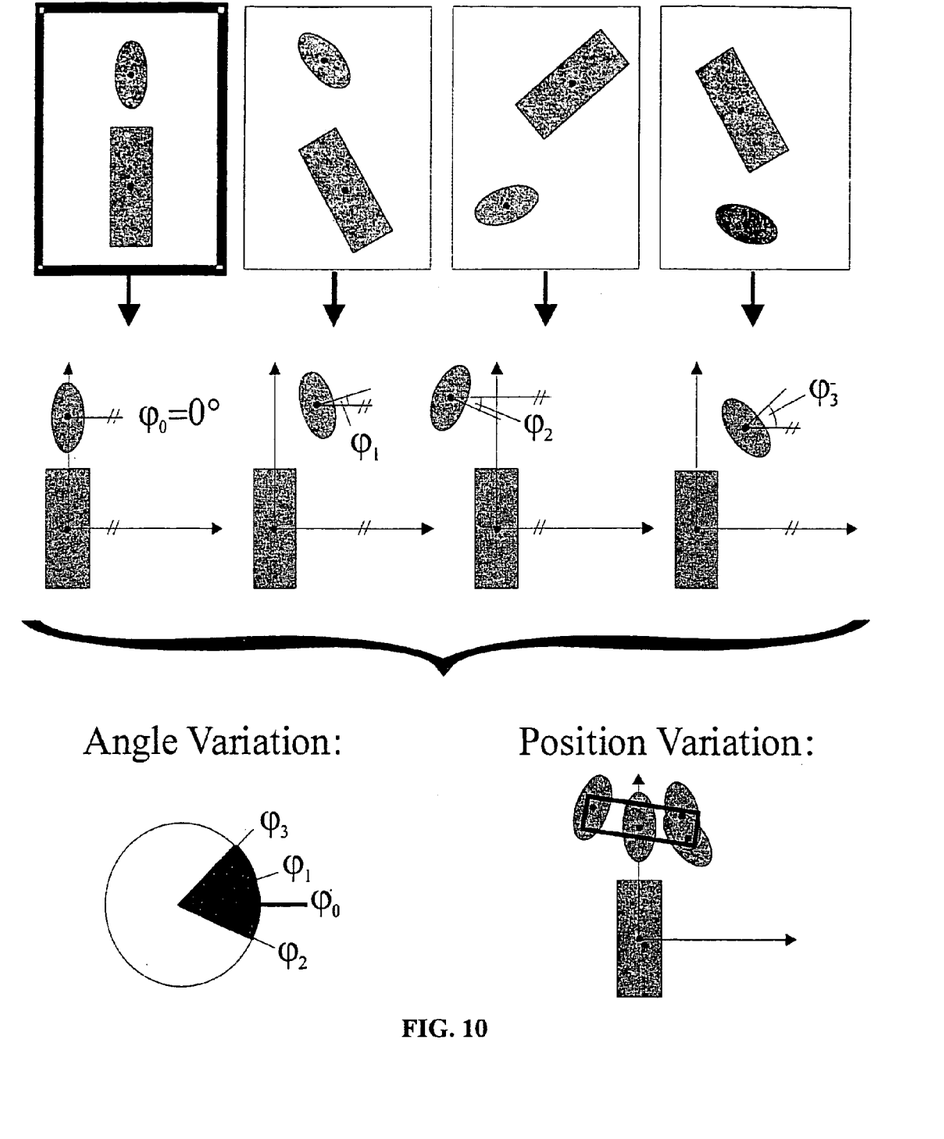
FIG. 10 illustrates the calculation of the relations between an object pair (rectangle and ellipse) from the relative poses in the model image (bold border) and in three example images (pictures in the upper row). In this example the rectangle is taken as reference and the relative movement of the ellipse is computed by transforming the ellipse into the reference system defined by the rectangle (pictures in the middle row). The overall relative orientation describes the angle variation (dark circle sector in the lower left picture) and the smallest enclosing rectangle of arbitrary orientation of all ellipse reference points is taken as position variation (bold rectangle in the lower right picture)

The pose parameters of the clustered components, i.e., rigid object parts, are analyzed and the pairwise relations between part i and j are derived (where i=1, . . . , $n_p$ and j=1, . . . , $n_p$ and $n_p$ is the number of object parts). For this purpose, in each image, the pose of object part i defines a local coordinate system in which the pose of object part j is calculated. In a preferred embodiment the angle range that encloses all orientations of object part j in the local coordinate systems of all example images describes the angle variation of object part j with respect to object part i. In a preferred embodiment, the corresponding position variation is described by the smallest enclosing rectangle of arbitrary orientation of the reference points of object part j in the local coordinate systems of all example images. Other descriptions beside the smallest enclosing rectangle of arbitrary orientation can be used instead, e.g., the smallest enclosing axis aligned rectangle, the convex hull, the smallest enclosing circle or other arbitrary descriptions of a set of points in the 2D plane. The principle is exemplified in FIG. 10.

Apart from the angle variation and the position variation the relation information additionally can include statistical values like the mean and the standard deviation of the relative angle and of the relative position. This information is calculated for each ordered object pair. In order to find an optimum search strategy that minimizes the entire search effort one has to define a measure that quantifies the search effort $\Omega_{ij}$ that must be expended to search object part j if the pose of object part i is known. In the preferred embodiment the search effort is defined as $$\Omega_{ij} = l_{ij} \cdot h_{ij} \cdot \Delta\phi_{ij}, \quad \text{(Equation 11)}$$

where $l_{ij}$ and $h_{ij}$ is the length and the height of the smallest enclosing rectangle, respectively, describing the position variation of part j relative to part i, and $\Delta\phi_{ij}$ specifies the corresponding angle variation. The calculation of the search effort strongly depends on the chosen object recognition method and should be adapted individually. Please note that $\Omega$ is not symmetric, i.e., $\Omega_{ij}$ is not necessarily equal to $\Omega_{ji}$. Since it cannot be expected that the example images cover the variations completely but only qualitatively, the values for $l_{ij}$, $h_{ij}$, and $\Omega\phi_{ij}$ can be adapted by applying a user selected tolerance.

Computation of the Hierarchical Search Tree

The strategy of the invention during the online phase is to search a selected root object part within the entire search range and then successively search the remaining parts only relatively to the object parts already found. To do so, the search region of the current object part's reference point is transformed regarding to the pose of the already found object part from which the current part is searched relatively. The equation for calculating the search effort $\Omega$ should be constructed in a way that the computation time of the chosen recognition methods increases linearly with $\Omega$. Therefore, the sum of the $\Omega$s that are accumulated during the search in the online phase must be minimized to find an optimum search strategy.

In a preferred embodiment of the invention the optimum search strategy that minimizes the overall recognition time can be computed by applying graph theory algorithms. The object parts are interpreted as vertices in a graph where the directed arc between the vertices i and j is weighted with the corresponding search effort $\Omega_{ij}$. Thus, a fully connected directed graph D=(V,A) is obtained, where V denotes the set of vertices of size $|V|=n_p$ and A the set of arcs of size $|A|=n_p(n_p-1)$. With each arc $a_{ij} \in A$ the weight $\Omega_{ij}$ is associated. An arborescence of D is a subtree of D such that there is a particular vertex called the root, which is not the terminal vertex of any arc, and that for any other vertex $v_i$, there is exactly one arc, whose terminal vertex is $v_i$. A spanning arborescence of D is an arborescence that contains all vertices of D. Thus, the problem of finding an optimum search strategy is equivalent to finding a spanning arborescence H=(V,B) of D, such that $$\sum_{(v_i, v_j) \in V} b_{ij} \to \min \quad \text{(Equation 12)}$$

An algorithm for finding the spanning arborescence of minimum weight in a graph is given in R8.

The root vertex can be chosen using different criteria. Since the root vertex corresponds to the only object part that is searched not relatively to another object part in the online phase but in the entire search range of the search image, the recognition time of the online phase strongly depends on the recognition time of the root part. Therefore, when using the recognition method presented in R21 large object parts should be preferred to be the root part since more discretization steps can be used to speed up the search. Furthermore, the root part should not be self-symmetric or similar to another object part to avoid ambiguities during the online phase, which slow down the search in the online phase. These two criteria can be evaluated automatically by the invention. In a preferred embodiment, the root part plays another decisive role: it should be ensured that the root part is always found during the search in the online phase, since the whole object cannot be found if the root part is missing or occluded to a high degree. Therefore, in practice, the third criterion must be evaluated by the user. In an alternative embodiment several root parts can be selected, which are subsequently searched. The number of root parts to select depends on the user defined maximum level of occlusion under which the object should be found during online phase as well as on the user defined maximum number of object instances that should be found. However, the computation time increases with the number of selected root parts.

Figure 11:
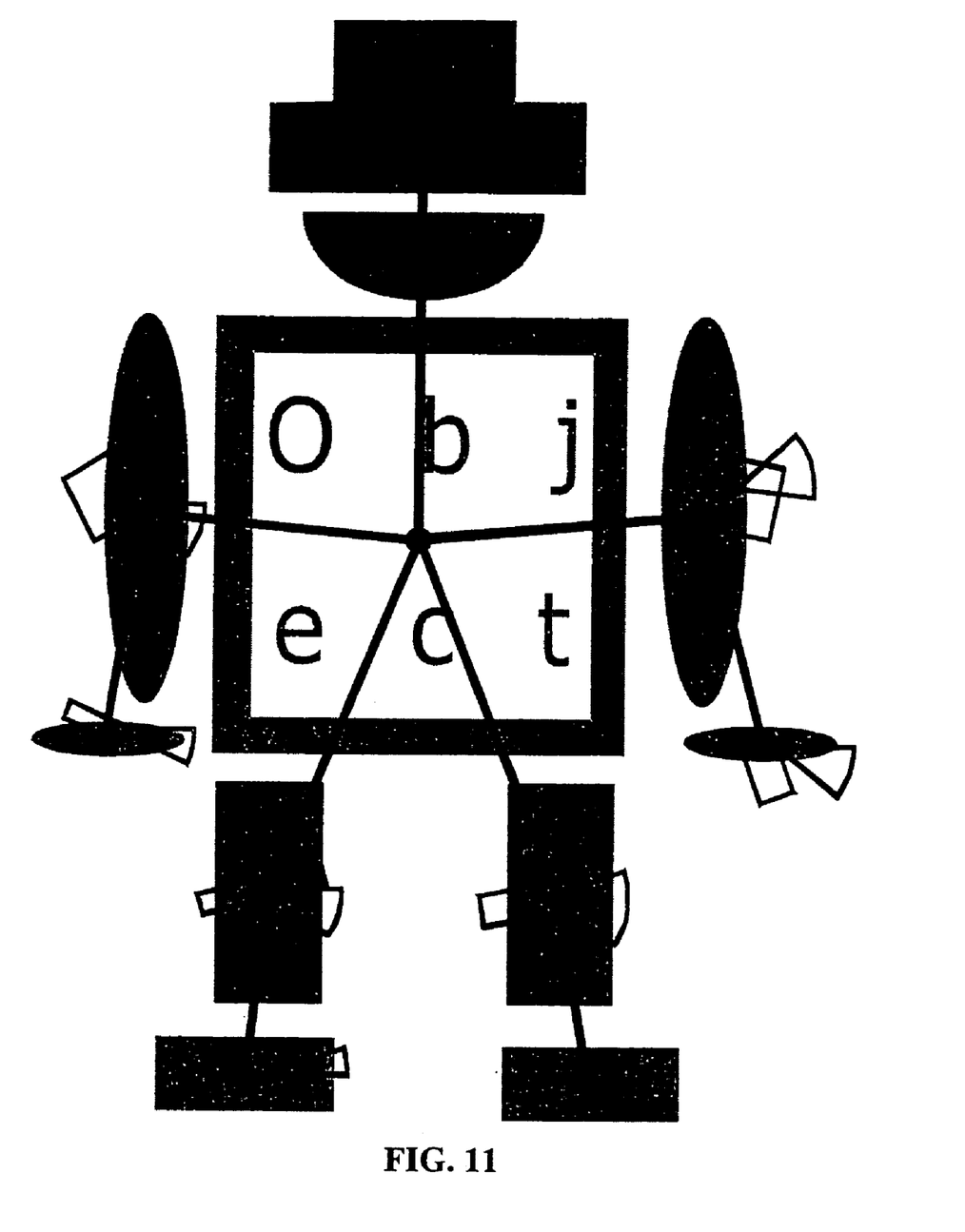
FIG. 11 illustrates the result of the hierarchical model generation. The search tree is visualized together with the relative search ranges for each object part. The position search ranges are visualized by rectangles and the angle search ranges are visualized by circle sectors.

FIG. 11 illustrates the result of the optimum search strategy. Here, the upper part of the body was selected to be the root part. Thus, the upper body is searched for in the entire search image, the left arm is searched relatively to the upper body taking the relations into account, the left hand is searched relatively to the left arm, etc.

Finally, the hierarchical model consists of the object part models, the relations between the parts, and the optimum search strategy.

Search of the Hierarchical Model

After the hierarchical model has been built in the offline phase following the steps described in the invention so far, it can be used to search the object in an arbitrary search image during the online phase. In a preferred embodiment of the invention the similarity measure presented in (Steger, 2001) is used to search the object part models of the hierarchical model in the search image in order to take advantage of the properties of this similarity measure like robustness to occlusions, clutter, arbitrary illumination changes, and sensor noise as well as high recognition accuracy and real-time computation. The poses of all found model parts belonging to the same found instance of a hierarchical model are stored in the hierarchical match.

In the first step, the root object part is searched in the search image. In a preferred embodiment each found instance of the root object part represents one potential candidate of a hierarchical match. In an alternative embodiment several root object parts are searched for to ensure a higher robustness of missing or occluded root object parts. Hence, each found instance of each root object part represents one potential candidate of a hierarchical match.

In the second step, for each candidate the remaining object parts are searched in the order of the search tree while limiting the search space of each object part according to the relations between the object parts as mentioned above.

In case that one object part could not be found, several strategies can be applied: In a preferred embodiment the object parts that in the search hierarchy reside directly below the missing object part are searched relative to the object part that in the search hierarchy resides closest above the missing object part and has been already found. In the worst case the root object part is selected to start the relative search. In an alternative embodiment of the invention the object parts that in the search hierarchy reside directly below the missing object part are searched relatively to the already found object part from which the search effort is minimal. In a further alternative embodiment of the invention all object parts that in the search hierarchy reside below the missing object part are not searched and are also treaded as missing.

In case that one object part is found more than once, in a preferred embodiment the current hierarchical match candidate is cloned according to the number of found object part matches and each match of the object part is assigned to one hierarchical match candidate. The search is continued for each hierarchical match. To avoid that parts are searched relative to the same object part instance several times in different hierarchical match candidates, the object part matches are stored in a separate list independently of the hierarchical match candidates. Additionally, the object part relative to which each object part in the list has been searched, is stored in the list. Each hierarchical match candidate just references the respective object part matches in the list by using pointers. If a match of an object part that is searched has already been stored in the list and has been searched relative to the same object part instance as the current match is searched, the current object part is not searched but only a pointer to the respective existing match in the list is added to the hierarchical match candidate.

To speed up the recognition not all object parts of each potential candidate match are searched: Like the preferred recognition method (R21), most recognition methods return a score value $s \in [0;1]$ that rates the quality of the returned matches. Additionally, the user can specify the minimum score value $s_{min}$ a match must at least have to be returned. In a preferred embodiment of the invention a score value $s^H$ for each hierarchical match is computed:

$$s^H = \sum_{i=1}^{n_p} s^i \frac{f^i}{F}, \text{ where} \qquad \text{(Equation 13)}$$

$$F = \sum_{i=1}^{n_p} f^i. \qquad \text{(Equation 14)}$$

$s^i$ denotes the score of object part i that is returned by the recognition method ($s^i$ is set to 0 if the object part was not found, i.e., $s^i < s_{min}$), and $f^i$ is a weighting factor that balances the contributions of the score values of the single object parts. In a preferred embodiment $f^i$ is proportional to the size of object part i. In an alternative embodiment, the user specifies the values $f^i$ for each object part. In a preferred embodiment the user specifies a minimum score value $s_{min}^H$ for the hierarchical match. Thus, the search for the current potential hierarchical candidate match can be aborted after j of the $n_p$ object parts have been searched, whenever the following condition is fulfilled:

$$\sum_{i=1}^{j} s^i \frac{f^i}{F} + \sum_{i=j+1}^{n_p} \frac{f^i}{F} < s_{min}^H. \qquad \text{(Equation 15)}$$

Additionally, the found instances of the hierarchical match candidates are checked if they overlap too much with other hierarchical match candidates. In a preferred embodiment of the invention the overlap between two hierarchical match candidates is checked by determining the smallest enclosing axis aligned rectangle of all smallest enclosing axis aligned rectangles of the object part instances for both hierarchical match candidates. If these two rectangles overlap a more precise overlap fraction is computed: First, for both hierarchical match candidates the smallest enclosing rectangles of arbitrary orientation are determined for each object part instance. The rectangles are united obtaining two regions, one for each hierarchical match candidate. The overlap fraction is calculated as the ratio of the area of the intersection of the two united regions and the smaller of the two united regions. If the overlap exceeds a user-supplied fraction, the hierarchical match candidate with the lower score value is deleted. The information of the smallest enclosing rectangles of arbitrary orientation for each object part can be computed in the offline phase. For the overlap check in the online phase they only have to be transformed according to the pose parameters of the object part matches, which facilitates an efficient computation of the overlap fraction.

The hierarchical match candidates with a score exceeding $s_{min}^H$ are interpreted as hierarchical matches and are returned to the user as the result of the search. In a preferred embodiment the returned matches include for each found instance of the hierarchical model the score value $s^H$, and for each found object part within each hierarchical model the subpixel precise row and column coordinates, the orientation angle, and the score value $s^i$.

While several particular embodiments of the invention have been described in detail, various modifications to the preferred embodiments can be made without departing from the spirit and scope of the invention. Accordingly, the above description is not intended to limit the invention except as indicated in the following claims.

REFERENCE LIST

R1 U.S. Pat. No. 6,324,299
R2 U.S. Pat. No. 6,411,734
R3 Bajcsy, R., Kovacic, S., 1989. Multi-resolution elastic matching. Computer Vision, Graphics, and Image Processing, 46(1): pp. 1–21.
R4 Ballard, D. H., 1981. Generalizing the Hough transform to detect arbitrary shapes. *Pattern Recognition*, 13(2), pp. 111–122.
R5 Belongie, S., Malik, J., Puzicha, J., 2002. Shape Matching and Object Recognition Using Shape Contexts, *Transactions on Pattern Analysis and Machine Intelligence*, 24(4), pp. 509–522.
R6 Borgefors, G., 1988. Hierarchical chamfer matching: A parametric edge matching algorithm. *IEEE Transactions on Pattern Analysis and Machine Intelligence*, 10(6), pp. 849–865.
R7 Brown, L. G., 1992. A survey of image registration techniques. ACM *Computing Surveys*, 24(4), pp. 325–376.
R8 Chu, Y. J. and Tseng-Hong, L., 1965. On the shortest arborescence of a directed graph. *Scientia Sinica*, 14(10), pp. 1396–1400.
R9 Chvátal, V., 1983. *Linear Programming*, W. H. Freeman and Company, New York.
R10 Elder, J., 1999. "Are Edges Incomplete?". *International Journal of Computer Vision*, 34(2/3), pp. 97–122.
R11 Hauck, A., Lanser, S., and Zierl, C., 1997. Hierarchical Recognition of Articulated Objects from Single Perspective Views. In: Proc. *Computer Vision and Pattern Recognition* (CVPR'97), IEEE Computer Society Press, pp. 870–883.
R12 Huttenlocher, D. P., Klanderman, and G. A., Rucklidge, W. J., 1993. Comparing Images using the Hausdorff Distance. *IEEE Transactions on Pattern Analysis and Machine Intelligence*, 15(9), pp. 850–863.
R13 Jain, A. K., Zhong, Y., and Lakshmanan, S., 1996. Object matching using deformable templates. *IEEE Transactions on patterns analysis and machine intelligence*, 18(3), pp. 267–277.
R14 Koch, K. R., 1987. *Parameterschätzung und Hypothesentests in linearen Modellen*. Dümmler, Bonn.
R15 Koffka, K., 1935. *Principles of Gestalt Psychology*. Harcourt Brace, New York.
R16 Lai, S. and Fang, M., 1999. Accurate and fast pattern localization algorithm for automated visual inspection. *Real-Time Imaging*, 5, pp. 3–14.
R17 Lowe, D. G., 1985. *Perceptual Organization and Visual Recognition*, Kluwer Academics, Boston.
R18 Marr, D., 1982. *Vision*, W. H. Freeman and Company, San Francisco, Calif.
R19 Murtagh, B. A., 1981. Advanced Linear Programming: Computation and Practice, McGraw-Hill, N.Y.
R20 Rucklidge, W. J., 1997. Efficiently locating objects using the Hausdorff distance. *International Journal of Computer Vision*, 24(3), pp. 251–270.
R21 Steger, C., 2001. Similarity measures for occlusion, clutter, and illumination invariant object recognition. In: *Mustererkennung* 2001, B. Radig and S. Florczyk (eds), Springer, Berlin, pp. 148–154.
R22 European Patent Application 00120269.6, System and method for object recognition, Filed Sep. 27, 2000.
R23 Ullman, S., 1979. *The interpretation of visual motion*. MIT Press, Cambridge, Mass.
R24 Ulrich, M., Steger, C., Baumgartner, A., and Ebner, H., 2001. Real-time object recognition in digital images for industrial applications. In: 5th *Conference on Optical 3-D Measurement Techniques*, Vienna, Austria, pp. 308–318.
R25 Ulrich, M. and Steger, C., 2001. Empirical performance evaluation of object recognition methods. In: *Empirical Evaluation Methods in Computer Vision*, H. I. Christensen and P. J. Phillips (eds), IEEE Computer Society Press, Los Alamitos, Calif., pp. 62–76.
R26 Wertheimer, M., 1938. Laws of Organization in Perceptual Forms. In: *A Source Book of Gestalt Psychology*, W. D. Ellis (ed), Harcourt Brace.
R27 Witkin, A. P. and Tenenbaum, J. M., 1983. On the Role of Structure in Vision. In: *Human and Machine Vision*, Jacob Beck and Barbara Hope and Azriel Rosenfeld (eds), Academic Press, New York.
R28 Rock, I. and Palmer, S., 1990. The legacy of Gestalt psychology. Scientific American, 263, pp. 84–90.

The invention claimed is:

1. A method for constructing a hierarchical model consisting of the following steps:
   a) constructing an initial object decomposition into components based on a model image;
   b) determining the relative poses of the components in a plurality of example images with respect to the model image;
   c) determining whether a plurality of components moves in an identical or similar manner over the sequence of example images and, if so, grouping such components, resulting together with the ungrouped components in the object parts;
   d) determining the relative poses of said grouped components in each example image;
   e) forming a hierarchical model, consisting of a root object part at the top of the hierarchy and a plurality of object parts at lower levels of the hierarchy, from the object parts using an optimization criterion that takes into account the relative poses of the object parts; and
   f) determining relative search spaces of the object parts to be used in the object recognition phase.

2. The method of claim 1, wherein the initial object decomposition is done by the user.

3. The method of claim 1, wherein the initial object decomposition is done automatically using a grouping method.

4. The method of claim 1, wherein the connected components of the image edges are used as initial components.

5. The method of claim 1, wherein the image edges are computed by an edge operator that at least provides the edge magnitude.

6. The method of claim 5, wherein said edge operator is a Sobel operator.

7. The method of claim 1 where the step of determining the relative poses of the components includes a further step of:
Eliminating the influence of neighboring components during pose determination.

8. The method of claim 1 wherein determining the relative poses includes:
Using an object recognition method that is based on gray value correlation as similarity measure.

9. The method of claim 1 wherein determining the relative poses includes:
using an object recognition method that is based on geometric features as similarity measure.

10. The method of claim 9, wherein said object recognition method is based on the generalized Hough transform.

11. The method of claim 9, wherein said object recognition method is based on the dot product of the edge gradient directions.

12. The method of claim 9, wherein said object recognition method is based on the Hausdorff distance.

13. The method of claim 1 further including the step of:
Eliminating ambiguous matches by selecting the match with highest probability.

14. The method of claim 13, wherein the match with the highest probability is selected to be the match that causes the smallest variation of relative poses in the example image with respect to the model image.

15. The method of claim 1 wherein determining whether a plurality of components moves in an identical or similar manner over the sequence of example images includes the steps of:
Computing the relative movement for each pair of components in each example image;
Computing a statistically value (mean, median, or maximum) of the relative movements over the example images;
Computing a dissimilarity matrix containing the statistical values; and
Clustering the dissimilarity matrix successively until the remaining statistical values exceed a user-defined threshold.

16. The method of claim 1 wherein determining whether a plurality of components moves in an identical or similar manner over the sequence of example images includes the steps of:
Computing the relative movement for each pair of components in each example image;
Calculating the probabilities that two components belong to the same object part using statistical methods;
Computing a similarity matrix containing the probabilities; and
Clustering the similarity matrix successively until the remaining probabilities are below a user-defined threshold.

17. The method of claim 15 wherein the grouping of the components includes:
Merging all components that are contained in the same cluster, calculated in claim 15.

18. The method of claim 16 wherein the grouping of the components includes:
Merging all components that are contained in the same cluster, calculated in claim 16.

19. The method of claim 1 wherein forming a hierarchical model from the object parts using an optimization criterion that takes into account the relative poses of the object parts includes the following steps:
Computing a variation measure for each directed pair of object parts;
Computing an optimization criterion based on the variation measure;
Computing an optimum hierarchical search tree based on the optimization criterion.

20. The method of claim 19, wherein the variation measure of one pair of object parts is a strictly monotonic increasing function of the search effort that must be expended by the object recognition method to search the second object part with respect to the first object part.

21. The method of claim 19 wherein the optimization criterion minimizes the overall sum of all variation measures, which are included in the hierarchical search.

22. The method of claim 19 wherein the optimum hierarchical search tree is calculated based on the optimization criterion by calculating the minimum spanning arborescence of the graph that describes the mutual variation measures.

23. The method of claim 1 wherein determining relative search spaces of the object parts to be used in the object recognition phase includes:
Computing for each directed pair of object parts the search space of the second object part with respect to the pose of the first object part.

24. The method of claim 23, wherein the search space is the convex hull of the poses over all example images in the n-dimensional pose space, where n describes the number of pose parameters.

25. The method of claim 24, further including:
Enlarging the search space by computing enclosing geometric shapes of the convex hull.

26. The method of claim 24 further including:
Enlarging the search space by a user-given tolerance.

27. A method for object recognition using a hierarchical model consisting of the following steps:
a) finding the root object part of the hierarchical model in the search image;
b) using the found pose of the previous object parts to construct search spaces for the object parts in the next lower level of the object hierarchy;
c) searching the object parts in said search spaces;
d) iterating steps b) and c) until all object parts of the model hierarchy have been searched; and
e) providing the poses of all object parts.

28. The method of claim 27, wherein finding the root object part of the hierarchical model includes:
Using an object recognition method that is based on gray value correlation as similarity measure.

29. The method of claim 27, wherein finding the root object part of the hierarchical model includes:
Using an object recognition method that is based on geometric features as similarity measure.

30. The method of claim 29, wherein said object recognition method is based on the generalized Hough transform.

31. The method of claim 29, wherein said object recognition method is based on the dot product of the edge gradient directions.

32. The method of claim 29, wherein said object recognition method is based on the Hausdorff distance.

33. The method of claim 27 wherein using the found pose of the previous object parts to construct search spaces for the object parts in the next lower level of the object hierarchy includes:

Transforming the search spaces of the object parts in the next lower level that are stored in the hierarchical model according to the pose parameters of the found pose of the previous object parts.

34. The method of claim 27 wherein searching the object parts in said search spaces includes:
using an object recognition method that is based on gray value correlation as similarity measure.

35. The method of claim 27 wherein searching the object parts in said search spaces includes:
using an object recognition method that is based geometric features as similarity measure.

36. The method of claim 27 wherein the step of iterating steps b) and c) until all object parts of the model hierarchy have been searched includes the following steps:
Checking whether the object part was not found;
Checking whether the object part was found more than once;
Computing a score value of the hierarchical match;
Checking whether a user-defined minimum score value can still be reached for the hierarchical match candidate; and
Checking whether all object parts of the model hierarchy have been searched.

37. The method of claim 36, wherein the step of checking whether the object part was not found includes:
Checking whether no valid match was returned by the object recognition method; and
If so, applying a special treatment for the object parts that in the search hierarchy reside directly below the missing object part.

38. The method of claim 37, wherein the step of applying a special treatment for the object parts that in the search hierarchy reside directly below the missing object part includes:
Treating the object parts also as missing.

39. The method of claim 37 wherein the step of applying a special treatment for the object parts that in the search hierarchy reside directly below the missing object part includes:
Searching the object parts relative to the already found object part that in the search hierarchy resides closest above the missing object part.

40. The method of claim 37, wherein the step of applying a special treatment for the object parts that in the search hierarchy reside directly below the missing object part includes:
Searching the object parts relative to the already found object part from which the search effort is minimal.

41. The method of claim 36 wherein the step checking whether the object part was found more than once includes the steps:
Checking whether more than one valid match was returned by the object recognition method;
If so, cloning the hierarchical match candidate according to the number of found object part instances;
Assigning each match of the object part to one hierarchical match candidate; and
Continuing the search for each hierarchical match candidate.

42. The method of claim 36 wherein computing a score value of the hierarchical match candidate includes:
Computing the score value of the hierarchical match candidate as a weighted sum of the score values of the individual object part matches.

43. The method of claim 42, wherein the weights are chosen according to the size of the object parts.

44. The method of claim 42 wherein the weights are chosen by the user.

45. The method of claim 36 wherein checking whether a user-defined minimum score value can still be reached for the hierarchical match includes:
Computing the sum of the current hierarchical match score and the score that can be achieved by the remaining object parts at most;
Checking the sum of being below the user-defined minimum score value; and
If so deleting the hierarchical match candidate.

46. The method of claim 27 further including the steps of:
Computing the overlap between the hierarchical match candidates;
Checking whether the overlap of two hierarchical match candidates exceeds a user-defined maximum value; and
If so, deleting the hierarchical match candidate with lower score.

* * * * *